United States Patent
Sudo et al.

(10) Patent No.: US 12,386,948 B2
(45) Date of Patent: Aug. 12, 2025

(54) SECURE COMPUTATION APPARATUS, SECURE COMPUTATION SYSTEM, SECURE COMPUTATION METHOD, AND PROGRAM

(71) Applicant: NIPPON TELEGRAPH AND TELEPHONE CORPORATION, Tokyo (JP)

(72) Inventors: Hiroki Sudo, Musashino (JP); Dai Ikarashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 126 days.

(21) Appl. No.: 18/565,091

(22) PCT Filed: Jun. 4, 2021

(86) PCT No.: PCT/JP2021/021366
§ 371 (c)(1),
(2) Date: Nov. 29, 2023

(87) PCT Pub. No.: WO2022/254691
PCT Pub. Date: Dec. 8, 2022

(65) Prior Publication Data
US 2024/0273180 A1 Aug. 15, 2024

(51) Int. Cl.
*G06F 21/52* (2013.01)
*G06F 21/71* (2013.01)

(52) U.S. Cl.
CPC ............ *G06F 21/52* (2013.01); *G06F 21/71* (2013.01); *G06F 2221/034* (2013.01)

(58) Field of Classification Search
CPC ..... G06F 21/52; G06F 21/71; G06F 2221/034
(Continued)

(56) References Cited

U.S. PATENT DOCUMENTS 11,949,778 B1 * 4/2024 Chopra ................. H04L 9/0894
12,250,297 B1 * 3/2025 Falk ...................... H04L 9/0631
(Continued)

OTHER PUBLICATIONS

Hamada et al., "Improved Algorithms for Computing Relational Algebra Operators for Secure Function Evaluation", The Institute of Electronics, Information and Communication Engineers, Technical Report of IEICE, LOIS2012-82, vol. 112, No. 446, 2013, pp. 1-6 (12 pages including English Translation).

*Primary Examiner* — Thanh T Le
(74) *Attorney, Agent, or Firm* — XSENSUS LLP (57) ABSTRACT

A concealed operation result indicating concealed information of an Intersect operation result of X and Y is obtained while $X=\{\{x_0, \ldots, x_{n-1}\}\}$ and $Y=\{\{y_0, \ldots, y_{m-1}\}\}$ are concealed. A secure computation device obtains a sequence ([s], [M]) including [s] including n [$B_0$] and m [$B_1$] and [M] including [$x_0$], . . . , [$x_{n-1}$] and [$y_0$], . . . , [$y_{m-1}$], performs stable sorting on the sequence ([s], [M]) according to an order relationship of content represented by each of the elements $M_0, \ldots, M_{n+m-1}$ to obtain a sequence ([s'], [M']), obtain [$eq_q$] where $eq_q=T$ when $M'_q=M'_{q+1}$ and $eq_q=F$ otherwise and [$seq_q$] where $seq_q=T$ when $s'_q=s'_{q+1}$ and $seq_q=F$ otherwise, obtain [$f_q$] where $f_q=D_1$ when $eq_q=T$ and $seq_q=F$ and $f_q=D_0$ otherwise, and outputs [$f_q$] and [$M'_q$]. Where, [α] is concealed information of α.

5 Claims, 4 Drawing Sheets

(58) Field of Classification Search
USPC .......................................................... 726/26
See application file for complete search history.

(56) References Cited

U.S. PATENT DOCUMENTS

| | | | |
|---|---|---|---|
| 2019/0036679 A1* | 1/2019 | Hirano | G09C 1/00 |
| 2021/0011953 A1* | 1/2021 | Ikarashi | H04L 9/008 |
| 2022/0051467 A1* | 2/2022 | Woop | G06T 1/60 |
| 2022/0078023 A1* | 3/2022 | Nicolas | G06F 21/602 |
| 2022/0100889 A1* | 3/2022 | Tan | G06F 21/6245 |
| 2022/0222366 A1* | 7/2022 | Nagaraja | G06F 16/285 |
| 2023/0102374 A1* | 3/2023 | Zhu | H04L 9/12 |
| | | | 726/26 |
| 2023/0359631 A1* | 11/2023 | Badrinarayanan | H04L 9/3239 |

* cited by examiner

SECURE COMPUTATION APPARATUS, SECURE COMPUTATION SYSTEM, SECURE COMPUTATION METHOD, AND PROGRAM

CROSS-REFERENCE TO RELATED APPLICATION

The present application is based on PCT filing PCT/JP2021/021366, filed Jun. 4, 2021, the entire contents of which are incorporated herein by reference.

TECHNICAL FIELD

The present invention relates to a cryptographic technique, and in particular, to a secure computation technique.

BACKGROUND ART

In a normal set, overlapping of elements is not allowed. On the other hand, a set in which overlapping of elements is allowed is referred to as a "multiset". The following Intersect operation is defined for the two multisets X and Y.

$$\text{Intersect } (X, Y) = X' \cap Y'$$

Here, X' represents a set obtained by removing an element overlap from the multiset X. That is, a set obtained by replacing the same plurality of elements belonging to the multiset X with a single element is X'. Similarly, Y' represents a set obtained by removing an element overlap from the multiset Y. X'∩Y' represents a product set of the sets X' and Y'.

In addition, a secure computation method in which concealed information of a product set computation result of two sets is obtained while concealing information by using the concealed information of the two sets is known (see, for example, Non Patent Literature 1).

CITATION LIST

Non Patent Literature

Non Patent Literature 1: Koki Hamada, Dai Ikarashi, and Koji Chida, "(Improved Algorithms for Computing Relational Algebra Operators for Secure Function Evaluation)", IEICE Technical Report LOIS2012-82, Vol. 112, No. 446, pp. 76-82, 2013.

SUMMARY OF INVENTION

Technical Problem

However, in the conventional secure computation method, overlapping of elements is not allowed in a set to be subjected to product-set computation. Therefore, it is not possible to obtain concealed information of Intersect (X, Y) by a conventional secure computation method using the concealed information of the two multisets X and Y as an input.

This problem can be solved by first using the concealed information of the two multisets X and Y as an input, obtaining the concealed information of the sets X' and Y' obtained by eliminating duplication of elements of the multisets X and Y by secure computation, and then obtaining the concealed information of the product set of the sets X' and Y' by applying a conventional secure computation method to the concealed information of the sets X' and Y'.

However, the computation cost of the secure computation for obtaining the concealed information of the set obtained by removing the duplication of the elements of the multiset from the concealed information of the multiset is large.

The present invention has been made in view of such a point, and an object of the present invention is to provide a technique of obtaining a concealed operation result representing concealed information of Intersect (X, Y) at a small computation cost by secure computation using concealed information of two multisets X and Y as an input.

Solution to Problem

As will be described below, the secure computation device of the present invention obtains a concealed operation result indicating concealed information of an Intersect operation result of a first multiset $X=\{\{x_0, \ldots, x_{n-1}\}\}$ and a second multiset $Y=\{\{y_0, \ldots, y_{m-1}\}\}$ while concealing the first multiset X and the second multiset Y. Here, n and m are positive integers, $i=0, \ldots, n-1$, $j=0, \ldots, m-1$, $q=0, \ldots, n+m-1$, and $[\alpha]$ is the concealed information of $\alpha$.

(A) An input flag adding unit receives n first elements $[x_0], \ldots, [x_{n-1}]$ and m second elements $[y_0], \ldots, [y_{m-1}]$ as inputs, and obtains an input flagged sequence ([s], [M]) including a sequence $[s]=([s_0], \ldots, [s_{n-1}], [s_n], \ldots, [s_{n+m-1}])=([B_0], \ldots, [B_0], [B_1], \ldots, [B_1])$ including n first values $[B_0]$ and m second values $[B_1]$ and a sequence $[M]=([M_0], \ldots, [M_{n-1}], [M_n], \ldots, [M_{n+m-1}])=([x_0], \ldots, [x_{n-1}], [y_0], \ldots, [y_{m-1}])$ including first elements $[x_0], \ldots, [x_{n-1}]$ and second elements $[y_0], \ldots, [y_{m-1}]$. Here, $B_0$ and $B_1$ are different from each other, each first value $[s_i]=[B_0]$ is associated with each first element $[M_i]=[x_i]$, and each second value $[s_{j+n}]=[B_1]$ is associated with each second element $[M_{j+n}]=[y_j]$.

(B) A stable sorting unit performs, by secure computation, stable sorting according to an order relation of contents represented by each of the elements $M_0, \ldots, M_{n+m-1}$ corresponding to the sequence [M] for the input flagged sequence ([s], [M]) while maintaining a correspondence between $[s_q]$ and $[M_q]$, to obtain a sorted sequence ([s'], [M']) including a sequence $[s']=([s'_0], \ldots, [s'_{n+m-1}])$ of sorted values $[s'_0], \ldots, [s'_{n+m-1}]$ and a sequence $[M']=([M'_0], \ldots, [M'_{n+m-1}])$ of sorted elements $[M'_0], \ldots, [M'_{n+m-1}]$.

(C) An equality check unit obtains a first equality check result $[eq_q]$ and a second equality check result $[seq_q]$ by secure computation using the sorted sequence ([s'], [M']). Here, $eq_q=T$ when $M'_q=M'_{q+1}$ holds, $eq_q=F$ when $M'_q=M'_{q+1}$ does not hold, $eq_{n+m-1}=F$, $seq_q=T$ when $s'_q=s'_{q+1}$ holds, $seq_q=F$ when $s'_q=s'_{q+1}$ does not hold, $seq_{n+m-1}=F$, and T and F are different from each other.

(D) An output flag generation unit obtains an output flag $[f_q]$ by secure computation using the first equality check result $[eq_q]$ and the second equality check result $[seq_q]$. Here, $f_q=D_1$ when "$eq_q=T$ and $seq_q=F$" holds, $f_q=D_0$ when "$eq_q=T$ and $seq_q=F$" does not hold, and $D_1$ and $D_0$ are different from each other.

(E) An output flag adding unit outputs the concealed operation result including the output flag $[f_q]$ and the sorted element $[M'_q]$ of the sequence [M'] associated with each other.

Advantageous Effects of Invention

As a result, with the concealed information of the two multisets X and Y as an input, it is possible to obtain the concealed operation result representing the concealed information of Intersect (X, Y) at a small computation cost by secure computation.

DESCRIPTION OF EMBODIMENTS

Hereinafter, an embodiment of the present invention will be described with reference to the drawings.

Definitions of Terms

First, symbols used in the embodiments will be defined.

$X=\{\{x_0, \ldots, x_{n-1}\}\}$ represents a multiset (first multiset) having $x_0, \ldots, x_{n-1}$ as elements. n is a positive integer representing the number of elements $x_0, \ldots, x_{n-1}$ belonging to the multiset X. n may be 1 or 2 or more. $i=0, \ldots, n-1$ is an index of the elements $x_0, \ldots, x_{n-1}$, and an element corresponding to the index i of the multiset X is expressed as $x_i$. The content (for example, numerical values, characters (letters, numbers, and the like), dates and time, and the like.) represented by any two or more of the elements $x_0, \ldots, x_{n-1}$ may be the same as each other, or the content represented by each of the elements $x_0, \ldots, x_{n-1}$ may be different. An order relation (order) corresponding to the content represented by each of the elements $x_0, \ldots, x_{n-1}$ is defined in the content represented by each of the elements $x_0, \ldots, x_{n-1}$, separately from the index i. For example, in a case where the elements $x_0, \ldots, x_{n-1}$ represent numerical values, an order relation (for example, descending or ascending order) according to the magnitude of the numerical values is defined for the numerical values indicated by the respective elements $x_0, \ldots, x_{n-1}$. For example, when the elements $x_0, \ldots, x_{n-1}$ represent an alphabet, an order relation (for example, alphabetical order or a reverse order thereof) according to the alphabet is defined in the alphabet indicated by the elements $x_0, \ldots, x_{n-1}$. For example, in a case where the elements $x_0, \ldots, x_{n-1}$ represent dates and times, an order relation (for example, the order of antegrade or retrograde time) according to the date and time is defined for the dates and times indicated by each of the elements $x_0, \ldots, x_{n-1}$. For example, when the elements $x_0, \ldots, x_{n-1}$ represent a plurality of types of characters such as numbers, letters, and symbols, an order relation (for example, the order of the character codes or the reverse order of the character codes, and the like) defined for the characters is defined for the characters indicated by each of the elements $x_0, \ldots, x_{n-1}$.

$Y=\{\{y_0, \ldots, y_{m-1}\}\}$ represents a multiset (second multiset) having $y_0, \ldots, y_{m-1}$ as elements. m is a positive integer representing the number of elements $y_0, \ldots, y_{m-1}$ belonging to the multiset Y. m may be 1 or 2 or more. $j=0, \ldots, m-1$ is an index of the element $y_0, \ldots, y_{m-1}$, and an element corresponding to the index j of the multiset Y is expressed as $y_j$. The content represented by any two or more of the elements $y_0, \ldots, y_{m-1}$ may be the same as each other, or the content represented by each of the elements $y_0, \ldots, y_{m-1}$ may be different. An order relation according to the content of the elements $y_0, \ldots, y_{m-1}$ is also defined in the elements $y_0, \ldots, y_{m-1}$, separately from the index j. Note that the definition of the order relation according to the content of the elements $y_0, \ldots, y_{m-1}$ (for example, descending order, descending order, alphabetical order, and the like) is the same as the definition of the order relation according to the content represented by each of the elements $x_0, \ldots, x_{n-1}$, and the order relation according to the content of the elements $x_0, \ldots, x_{n-1}; y_0, \ldots, y_{m-1}$ is also defined for the elements $x_0, \ldots, x_{n-1}, y_0, \ldots, y_{m-1}$.

$(\kappa_0, \ldots, \kappa_{P-1})$ represents a sequence of P elements $\kappa_0, \ldots, \kappa_{P-1}$. For example, the sequence $(\kappa_0, \ldots, \kappa_{P-1})$ is a vector having elements $\kappa_0, \ldots, \kappa_{P-1}$, but the embodiment of the sequence $(\kappa_0, \ldots, \kappa_{P-1})$ is not limited. P is a positive integer representing the number of elements $\kappa_0, \ldots, \kappa_{P-1}$ belonging to the sequence $(\kappa_0, \ldots, \kappa_{P-1})$. $p=0, \ldots, P-1$ are indexes of the elements $\kappa_0, \ldots, \kappa_{P-1}$, and an element corresponding to the index p of the sequence $(\kappa_0, \ldots, \kappa_{P-1})$ is expressed as $\kappa_p$.

$[\alpha]$ represents concealed information of $\alpha$. That is, $[\alpha]$ represents information obtained by concealing $\alpha$. In a case where $\alpha$ is a sequence $(\kappa_0, \ldots, \kappa_{P-1})$ of the plurality of elements $\kappa_0, \ldots, \kappa_{P-1}$, the sequence $[\kappa_0], \ldots, [\kappa_{P-1}]$ of the concealed information of each of the plurality of elements $\kappa_0, \ldots, \kappa_{P-1}$ included in $\alpha=(\kappa_0, \ldots, \kappa_{P-1})$ is also expressed as $[\alpha]$. However, the concealed information $[\alpha]$ is information for which secure computation can be performed. That is, it is possible to obtain the concealed information $[\beta]$ of the calculation result $\beta$ with respect to $\alpha$ by the secure computation using the concealed information $[\alpha]$ while $\alpha$ remains concealed. The secure computation may be based on secret sharing (see, for example, Non Patent Literature 1) or based on homomorphic encryption. In the former case, $[\alpha]$ is a share obtained by subjecting $\alpha$ to secret sharing (also referred to as a secret share or a secret sharing value). In the latter case, $[\alpha]$ is a ciphertext obtained by encrypting $\alpha$ according to the homomorphic encryption scheme.

<Secret Sharing>

The secret sharing is an encryption method in which data is divided into a plurality of values (shares) and distributed to a plurality of parties. An example of secret sharing is (K, N) threshold secret sharing. (K, N) threshold secret sharing is a system in which original data is divided into N random shares and distributed to a plurality of parties, and is a secret sharing method having a property that when K or more shares are collected, the original data can be restored, but information of the original data cannot be obtained from less than K shares. Where K and N are positive integers satisfying K≤N. Specific examples of (K, N) threshold secret sharing are Shamir secret sharing (see, for example, Reference Literature 1) and reproduction secret sharing (see, for example, Reference Literature 2 and Reference Literature 3).

Reference Literature 1: Adi Shamir, "How to share a secret," Communications of the ACM, Vol. 22, No. 11, pp. 612-613, 1979.

Reference Literature 2: Mitsuru Ito, Akira Saito, and Takao Nishizeki, "Secret sharing scheme realizing general access structure," Electronics and Communications in Japan (Part III: Fundamental Electronic Science), Vol. 72, No. 9, pp. 56-64, 1989.

Reference Literature 3: Ronald Cramer, Ivan Damgard, and Yuval Ishai, "Share conversion, pseudorandom secret-sharing and applications to secure computation," In Theory of Cryptography Conference, pp. 342-362. Springer, 2005.

Hereinafter, operation by secure computation will be exemplified (see, for example, Non Patent Literature 1).

<Equal Sign Determination>

The equality check of the concealed information $[\alpha_1]$ and $[\alpha_2]$ by secure computation means an operation that uses the concealed information $[\alpha_1]$ and $[\alpha_2]$ (for example, share) of gi and $\alpha_2$ as inputs and outputs concealed information $[\beta]$ (for example, share) of a true/false value $\beta \in \{T, F\}$ in which $\beta=T$ (true) when $\alpha_1=\alpha_2$ and $\beta=F$ (false) when not $\alpha_1=\alpha_2$. Here, T and F represent different values (T≠F), for example, T=1 and F=0. The execution of this operation will be described as follows.

$$[\beta] \leftarrow E_Q([\alpha_1], [\alpha_2])$$

<NOT Operation>

The NOT operation of the concealed information $[\alpha]$ by secure computation means an operation that uses the concealed information $[\alpha]$ of $\alpha \in \{T, F\}$ as an input and outputs the concealed information $[\beta]$ of a true/false value $\beta \in \{T, F\}$ in which $\beta=F$ (false) when $\alpha=T$ (true) and $\beta=T$ (true) when $\alpha=F$ (false). For example, in a case where T=1 and F=0, $\beta=\alpha$ (XOR) 1 is satisfied. Here, $\alpha_1$ (XOR) $\alpha_2$ represents an exclusive OR of $\alpha_1$ and $\alpha_2$. The execution of this operation will be described as follows.

$$[\beta] \leftarrow N_{OT}([a])$$

<AND Operation>

The AND operation of the concealed information $[\alpha_1]$ and $[\alpha_2]$ by secure computation means an operation of using the concealed information $[\alpha_1]$ and $[\alpha_2]$ of $\alpha_1, \alpha_2 \in \{T, F\}$ as inputs and outputting the concealed information $[\beta]$ of the logical product $\beta=\alpha_1$ (AND) $\alpha_2 \in \{T, F\}$ of $\alpha_1$ and $\alpha_2$. When $\alpha_1=T$ (true) and $\alpha_2=T$ (true), $\beta=T$ (true), and otherwise, $\beta=F$ (false). The execution of this operation will be described as follows.

$$[\beta] \leftarrow A_{ND}([\alpha_1], [\alpha_2])$$

<Concealed Stable Sorting>

The concealed stable sorting of the sequence $[\alpha]=([\alpha_0], \ldots, [\alpha_{P-1}])$ by secure computation means processing of using the concealed information $[\alpha_0], \ldots, [\alpha_{P-1}]$ of the elements $\alpha_0, \ldots, \alpha_{P-1}$ belonging to the sequence $(\alpha_0, \ldots, \alpha_{P-1})$ as inputs, and outputting the concealed information $[\alpha']=([\alpha'_0], \ldots, [\alpha'_{P-1}])$ of the stable sorting results $\alpha'_0, \ldots, \alpha'_{P-1}$ of the elements $\alpha_0, \ldots, \alpha_{P-1}$ according to the order relation of the contents represented by the elements $\alpha_0, \ldots, \alpha_{P-1}$, respectively. Here, the stable sorting results $\alpha'_0, \ldots, \alpha'_{P-1}$ are obtained by stably sorting the elements $\alpha_0, \ldots, \alpha_{P-1}$ in descending order or ascending order according to the order relationship of the content represented by each of the elements $\alpha_0, \ldots, \alpha_{P-1}$, but whether the order is descending order or ascending order may be determined in advance or may be determined on the basis of input. The concealed stable sorting includes the following two algorithms (GenPerm, $S_{ORT}$).

$[\Pi] \leftarrow$ GenPerm $([\alpha])$: The algorithm GenPerm uses $[\alpha]=([\alpha_0], \ldots, [\alpha_{P-1}])$ as an input, and outputs concealed information $[\Pi]$ of permutation information $\Pi$ for concealed stable sorting $[\alpha_0], \ldots, [\alpha_{P-1}]$ into $[\alpha'_0], \ldots, [\alpha'_{P-1}]$ by secure computation.

$[\alpha'] \leftarrow S_{ORT}([\Pi], [\alpha])$: The algorithm $S_{ORT}$ uses $[\Pi]$ and $[\alpha]$ as inputs, and obtains and outputs $[\alpha']$ by secure computation.

A high-speed mounting method for realizing this is disclosed in Reference Literature 4 and the like.

Reference Literature 4: Dai Ikarashi, Koki Hamada, Ryo Kikuchi, Koji Chida, (A Design and an Implementation of Super-high-speed Multi-party Sorting: The Day When Multi-party Computation Reaches Scripting Languages: The Day When Multi-party Computation Reaches Scripting Languages)," In CSS2017, pp. 1-8, 2017.

EMBODIMENT

Next, an embodiment of the present invention will be described.

<Configuration>

Figure 1:
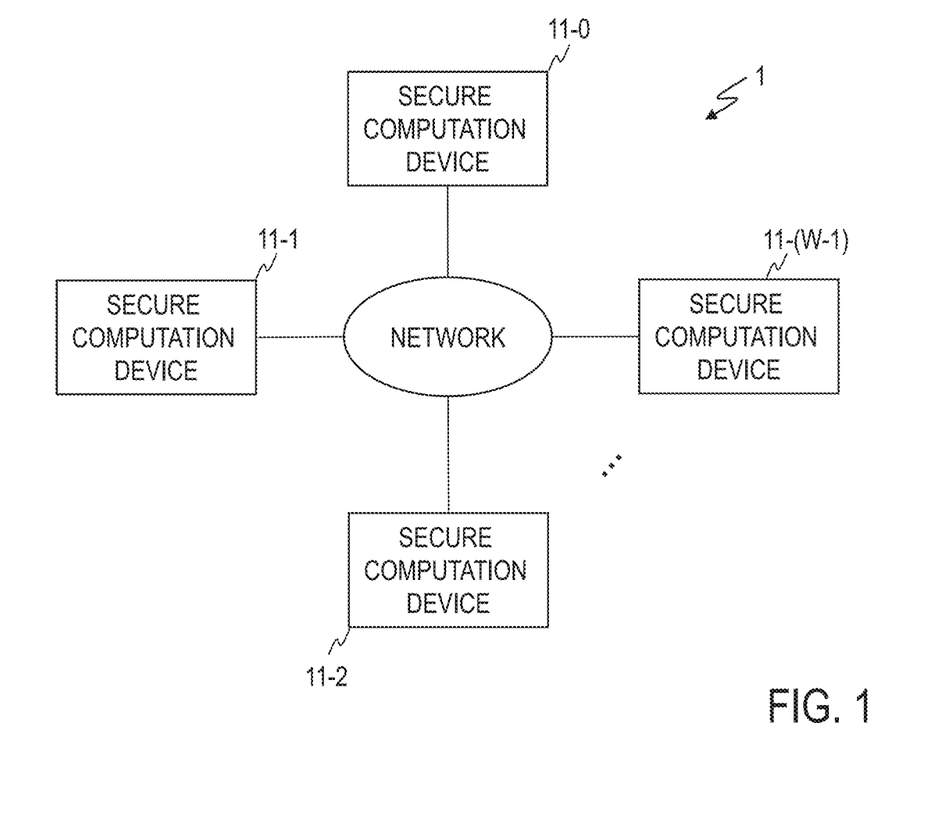
FIG. 1 is a block diagram illustrating a functional configuration of a secure computation system according to an embodiment.

As illustrated in FIG. 1, a secure computation system 1 of the present embodiment includes W secure computation devices 11-0, . . . , 11-(W−1) configured to be able to communicate via a network. Where, W is an integer of 1 or more. For example, in a case where the secure computation devices 11-0, . . . , 11-(W−1) perform secure computation based on secret sharing, W is an integer of 2 or more, and in a case where the secure computation based on homomorphic encryption is performed, W is an integer of 1 or more.

Figure 2:
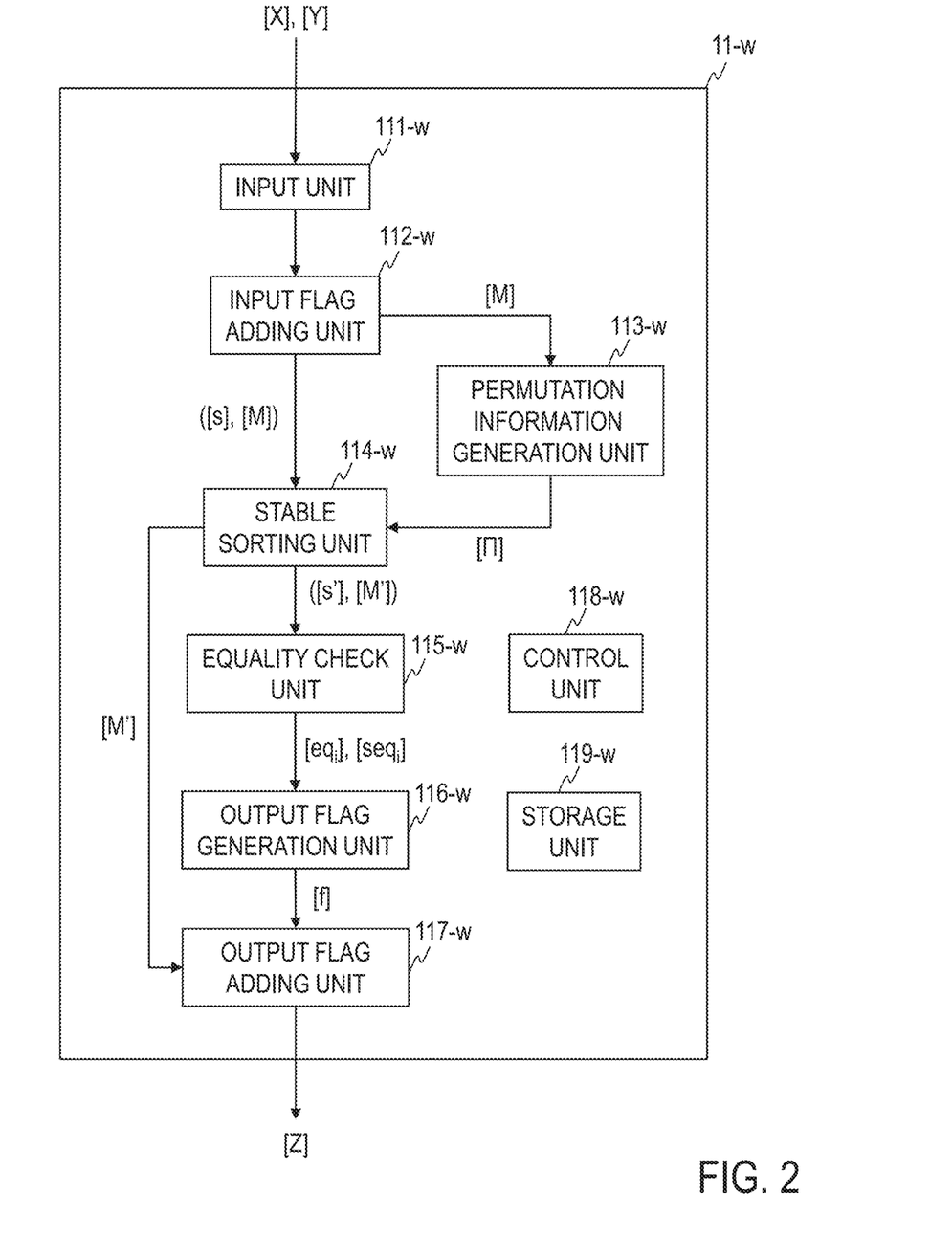
FIG. 2 is a block diagram illustrating a functional configuration of a secure computation device according to the embodiment.

As illustrated in FIG. 2, the secure computation device 11-w (where w=0, . . . , W−1) includes an input unit 111-w, an input flag adding unit 112-w, a permutation information generation unit 113-w, a stable sorting unit 114-w, an equality check unit 115-w, an output flag generation unit 116-w, an output flag adding unit 117-w, a control unit 118-w, and a storage unit 119-w. The secure computation device 11-w executes each processing based on the control of the control unit 118-w, and the data input to the secure computation device 11-w and the data obtained in each processing are stored in the storage unit 119-w, read as necessary, and used for other processing.

<Processing>

The secure computation device 11-w (where w=0, . . . , W−1) obtains and outputs the concealed operation result $[Z]$ of the data structure representing the concealed information [Intersect (X, Y)] of the Intersect operation result Intersect (X, Y)=X'∩Y' between the multiset X and the multiset Y while concealing the multiset (first multiset) X={{$x_0, \ldots, x_{n-1}$}} of the number of elements n and the multiset (second multiset) Y={{$y_0, \ldots, y_{m-1}$}} of the number of elements m by the secure computation. Here, X' represents a set obtained by removing element overlap from the multiset X, and Y' represents a set obtained by removing element overlap from the multiset Y. As a specific example, for example, in a case where elements of the multisets X and Y represent an alphabet, n=5 and m=3, and X={{$x_0, x_1, x_2, x_3, x_4$}}={{a, a, b, c, d}} and Y={{$y_0, y_1, y_2$}}={{b, b, c}}, X'={a, b, c, d} and Y'={b, c}, and Intersect (X, Y)=X' (Y'={b, c}. The secure computation processing of the secure computation device 11-w will be described with reference to FIG. 3.

Figure 3:
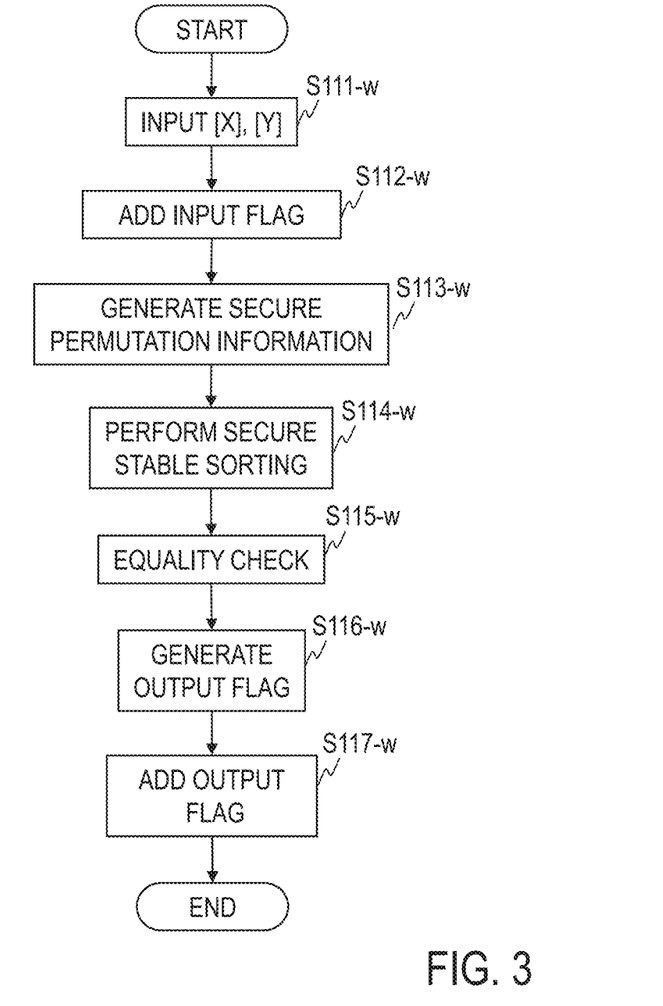
FIG. 3 is a flowchart illustrating a secure computation method according to the embodiment.

The concealed information $[X]=([x_0], \ldots, [x_{n-1}])$ of the multiset X={{$x_0, \ldots, x_{n-1}$}} and the concealed information $[Y]=([y_0], \ldots, [y_{m-1}])$ of the multiset Y={{$y_0, \ldots, y_{m-1}$}} are input to the input unit 111-w of the secure computation device 11-w. In the above specific example, [X]=([a], [a],

[b], [c], [d]) and [Y]=([b], [b], [c]) are input. [X] and [Y] may be sent from any of the W secure computation devices 11-0, . . . , 11-(W−1), or may be sent from another device (not illustrated) (step S111-*w*).

n elements (first elements) [$x_0$], . . . , [$x_{n-1}$] included in [X]=([$x_0$], . . . , [$x_{n-1}$]) and m elements (second elements) [$y_0$], . . . , [$y_{m-1}$] included in [Y]=([$y_0$], . . . , [$y_{m-1}$]) are input to the input flag adding unit 112. For example, in the case of the above specific example, the five elements [a], [b], [c], and [d] and the three elements [b], [b], and [c] are input to the input flag adding unit 112.

First, the input flag adding unit 112 sets [$s_0$] and [$s_1$] shown in Expressions (1) and (2).

$$[s0] = [B_0]^n = ([B_0], \ldots, [B_0]) = ([s_0], \ldots, [s_{n-1}]) \quad (1)$$

$$[s1] = [B_1]^n = ([B_1], \ldots, [B_1]) = ([s_1], \ldots, [s_{m-1}]) \quad (2)$$

Here, $B_0$ and $B_1$ are different from each other. $B_0$ and $B_1$ are not limited, and for example, $B_0=0$ and $B_1=1$ may be satisfied, or $B_0=1$ and $B_1=0$ may be satisfied.

Next, the input flag adding unit 112 obtains and outputs a sequence with an input flagged sequence ([s], [M]) including the sequence [s] and the sequence [M]. Where, the sequence [s] is obtained by arranging the sequence ([$B_0$], . . . , [$B_0$]) of the n values [$B_0$], . . . , [$B_0$] of Expression (1) followed by the sequence ([$B_1$], . . . , [$B_1$]) of the m values [$B_1$], . . . , [$B_1$] of Expression (2), and includes the n values (first values) [$B_0$] and the m values (second values) [$B_1$]. The sequence [M] is obtained by arranging n elements [$x_0$], . . . , [$x_{n-1}$] followed by m elements [$y_0$], . . . , [$y_{m-1}$], and includes n elements [$x_0$], . . . , [$x_{n-1}$] and m elements [$y_0$], . . . , [$y_{m-1}$]. These are expressed as Expressions (3) and (4) below.

$$[s] = \quad (3)$$
$$([s_0], \ldots, [s_{n-1}], [s_n], \ldots, [s_{n+m-1}]) = ([B_0], \ldots, [B_0], [B_1], \ldots, [B_1])$$

$$[M] = ([M_0], \ldots, [M_{n-1}], [M_n], \ldots, [M_{n+m-1}]) = \quad (4)$$
$$([x_0], \ldots, [x_{n-1}], [y_0], \ldots, [y_{m-1}])$$

Here, in the input flagged sequence ([s], [M]), [$s_i$]=[$B_0$] is associated with [$M_i$]=[$x_i$], and [$s_{j+n}$]=[$B_1$] is associated with [$M_{j+n}$]=[$y_j$]. That is, [$B_0$] is a concealed flag given to [$x_i$] corresponding to the multiset X, and [$B_1$] is a concealed flag given to [$y_j$] corresponding to the multiset Y. For example, the input flag adding unit 112 vertically combines ([$s0^T$], [$X^T$]) and ([$s1^T$], [$Y^T$]), and outputs the combined result as an input flagged sequence ([s], [M]). Where $\alpha^T$ represents transposition of $\alpha$. That is, the input flag adding unit 112 outputs, for example, the following input flagged sequence ([s], [M]).

$$([s], [M]) = \begin{pmatrix} [s_0] & [M_0] \\ \vdots & \vdots \\ [s_{n-1}] & [M_{n-1}] \\ [s_n] & [M_n] \\ \vdots & \vdots \\ [s_{n+m-1}] & [M_{n+m-1}] \end{pmatrix} = \begin{pmatrix} [B_0] & [x_0] \\ \vdots & \vdots \\ [B_0] & [x_{n-1}] \\ [B_1] & [y_0] \\ \vdots & \vdots \\ [B_1] & [y_{m-1}] \end{pmatrix}$$

For example, if X={{a, a, b, c, d}} and Y={{b, b, c}}, and $B_0=0$ and $B_1=1$, then the input flagged sequences ([s], [M]) would be as follows:

$$([s], [M]) = \begin{pmatrix} [0] & [a] \\ [0] & [a] \\ [0] & [b] \\ [0] & [c] \\ [0] & [d] \\ [1] & [b] \\ [1] & [b] \\ [1] & [c] \end{pmatrix} \quad (5)$$

The column [M] is sent to the permutation information generation unit **113-*w*, and the input flagged sequence ([s], [M]) is sent to the stable sorting unit 114-*w*** (step S112-*w*).

The sequence [M] is input to the permutation information generation unit **113-*w*. The permutation information generation unit 113-*w* applies the above-described algorithm GenPerm to the sequence [M] by secure computation ([Π]=←GenPerm ([M])), to obtain and output the concealed information [Π] of the substitution information Π for concealed stable sorting ([$M_0$], . . . , [$M_{n-1}$], [$M_n$], . . . , [$M_{n+m-1}$]) to ([$M'_0$], . . . , [$M'_{n-1}$], [$M'_n$], . . . , [$M'_{n+m-1}$]). The concealed information [Π] is sent to the stable sorting unit 114-*w*** (step S113-*w*).

The input flagged sequence ([s], [M]) and the concealed information [Π] are input to the stable sorting unit **114-*w*. The stable sorting unit 114-*w*** applies the algorithm $S_{ORT}$ described above to the input flagged sequence ([s], [M]) and the concealed information [Π] (([s'], [M'])←$S_{ORT}$([Π], ([s], [M]))), and for the input flagged sequence ([s], [M]), while maintaining the correspondence between [$s_q$] and [$M_q$] for q=0, . . . , n+m−1, performs stable sorting (concealed stable sorting) according to the order relationship of the contents represented by the elements $M_0$, . . . , $M_{n+m-1}$ corresponding to the sequence [M] by secure computation, to obtain and output a sorted sequence ([s'], [M']). [s'] is the sequence [s']=([$s'_0$], . . . , [$s'_{n+m-1}$]) of the sorted values [$s'_0$], . . . , [$s'_{n+m-1}$], [M'] is the sequence [M']=([$M'_0$], . . . , [$M'_{n+m-1}$]) of the sorted elements [$M'_0$], . . . , [$M'_{n+m-1}$], and the sorted sequence ([s'], [M']) is expressed as follows:

$$([s'], [M']) = \begin{pmatrix} [s'_0] & [M'_0] \\ \vdots & \vdots \\ [s'_{n+m-1}] & [M'_{n+m-1}] \end{pmatrix}$$

Here, the sequence of $M'_0$, . . . , $M'_{n+m-1}$ is a stable sorting result of the sequence of the elements $M_0$, . . . , $M_{n+m-1}$ according to the order relation of the contents represented by the elements $M_0$, . . . , $M_{n+m-1}$, and each sorted value [$s'_q$] is the element [$s_r$] associated with the element [$M_r$] stably sorted to each sorted element [$M'_q$] by secure computation. Where, q=0, . . . , n+m−1, and r=0, . . . , n+m−1. For example, in the case of the input flagged sequence ([s], [M]) exemplified in Expression (5), the following sorted sequence ([s'], [M']) is obtained.

$$([s'], [M']) = \begin{pmatrix} [0] & [a] \\ [0] & [a] \\ [0] & [b] \\ [1] & [b] \\ [1] & [b] \\ [0] & [c] \\ [1] & [c] \\ [0] & [d] \end{pmatrix} \quad (6)$$

The sorted sequence ([s'], [M']) is sent to the equality check unit 115-w, and the sequence [M'] is sent to the output flag adding unit 117-w (step S114-w).

The sorted sequence ([s'], [M']) is input to the equality check unit 115-w. The equality check unit 115-w obtains and outputs an equality check result (first equality check result) [$eq_q$] and an equality check result (second equality check result) [$seq_q$] for q=0, ..., n+m−1 by secure computation using the sorted sequence ([s'], [M']). Here, $eq_q$=T when $M'_q$=$M'_{q+1}$ holds, $eq_q$=F when $M'_q$=$M'_{q+1}$ does not hold, $eq_{n+m-1}$=F, $seq_q$=T when $s'_q$=$s'_{q+1}$ holds, $seq_q$=F when $s'_q$=$s'_{q+1}$ does not hold, $seq_{n+m-1}$=F, and T and F are different from each other Although T and F are not limited, for example, T=1 and F=0 may be satisfied, or T=0 and F=1 may be satisfied. These processing procedures can be realized by equality check of the concealed information [$M'_q$] and [$M'_{q+1}$] by the above-described secure computation and equality check of the concealed information [$s'_q$] and [$s'_{q+1}$] by the secure computation. For example, the equality check unit 115-w executes Expressions (7) and (8) below for q=0, ..., n+m−1 (that is, q∈[0, n+m)) by secure computation to obtain and output the equality check results [$eq_q$] and [$seq_q$]. Since these processing procedures do not depend on the order, it is also possible to execute the processing procedures of Expressions (7) and (8) in parallel for q=0, ..., n+m−1.

$$[eq_q] \leftarrow E_Q([M'_q], [M'_{q+1}]) \text{ where } [eq_{n+m-1} = F] = [F] \quad (7)$$

$$[seq_q] \leftarrow E_Q([s'_q], [s'_{q+1}]) \text{ where } [seq_{n+m-1}] = [F] \quad (8)$$

For example, in the case of the sorted sequence ([s'], [M']) exemplified in Expression (6), in a case where T=1 and F=0, equality check results [$eq_q$] and [$seq_q$] of Expressions (9) and (10) below are obtained.

$$[eq_0] = [1], [eq_1] = [0], [eq_2] = [1], [eq_3] = [1], [eq_4] = [0], [eq_5] = [1], \quad (9)$$
$$[eq_6] = [0], [eq_7] = [0]$$

$$[seq_0] = [1], [seq_1] = [1], [seq_2] = [0], [seq_3] = \quad (10)$$
$$[1], [seq_4] = [0], [seq_5] = [0], [seq_6] = [0], [seq_7] = [0]$$

The equality check results [$eq_q$] and [$seq_q$] are sent to the output flag generation unit 116-w (step S115-w).

The equality check results [$eq_q$] and [$seq_q$] are input to the output flag generation unit 116-w. The output flag generation unit 116-w obtains and outputs the output flag [$f_q$] by secure computation using the equality check results [$eq_q$] and [$seq_q$]. Here, $f_q$=$D_1$ when "$eq_q$=T and $seq_q$=F" holds, $f_q$=$D_0$ when "$eq_q$=T and $seq_q$=F" does not hold, and $D_1$ and $D_0$ are different from each other. Although $D_1$ and $D_0$ are not limited, for example, $D_1$=1 and $D_0$=0 may be satisfied, or $D_1$=0 and $D_0$=1 may be satisfied.

This processing can be realized as in Expression (11) below by setting $D_1$=T and $D_0$=F and using the NOT operation and the AND operation of the concealed information by the secure computation described above.

$$[f_q] \leftarrow A_{ND}([eq_q], N_{OT}([seq_q])) \quad (11)$$

The sequence [f] of the output flag [$f_q$] is expressed as follows:

$$[f] = \begin{pmatrix} [f_0] \\ \vdots \\ [f_{n+m-1}] \end{pmatrix}$$

For example, in the case of the equality check results [$eq_q$] and [$seq_q$] of Expressions (9) and (10), when $D_1$=1 and $D_0$=0, the sequence [f] is as follows:

$$[f] = \begin{pmatrix} [0] \\ [0] \\ [1] \\ [0] \\ [0] \\ [1] \\ [0] \\ [0] \end{pmatrix} \quad (12)$$

The sequence [f] is sent to the output flag adding unit 117-w (step S116-w).

The sequence [f] and the sequence [M'] are input to the output flag adding unit 117-w. For q=0, ..., n+m−1, the output flag adding unit 117-w associates the output flag [$f_q$] of the sequence [f] and the sorted element [$M'_q$] of the sequence [M'] with each other, and outputs the concealed operation result [Z] including the output flag [$f_q$] and the sorted element [$M'_q$] associated with each other. For example, the concealed operation result [Z] is expressed as follows:

$$([Z]) = ([f], [m']) = \begin{pmatrix} [f_0] & [M'_0] \\ \vdots & \vdots \\ [f_{n+m-1}] & [M'_{n+m-1}] \end{pmatrix}$$

For example, in the case of the sequence [M'] of Expression (6) and the sequence [f] of Expression (12), the concealed operation result [Z] is as follows:

$$([Z]) = \begin{pmatrix} [0] & [a] \\ [0] & [a] \\ [1] & [b] \\ [0] & [b] \\ [0] & [b] \\ [1] & [c] \\ [0] & [c] \\ [0] & [d] \end{pmatrix} \quad (13)$$

The concealed operation result [Z] represents concealed information [Intersect (X, Y)] of the Intersect operation result Intersect (X, Y)=X'∩Y' between the multiset X and the multiset Y. That is, $M'_h$ corresponding to the sorted element [$M'_h$] associated with the output flag [$f_h$] in which $f_h = D_1$ (where $h \in \{0, \ldots, n+m-1\}$) in the sequence [f] is an element of Intersect (X, Y). For example, in the case of Expression (13) in which $D_1=1$ and $D_0=0$, b and c corresponding to the sorted element [b] [c] associated with the output flag $[f_h]$ in which $f_h=1$ in the sequence [f] are the elements of Intersect (X, Y) (step S117-$w$).

Features of Present Embodiment

As described above, the stable sorting unit 114-$w$ performs stable sorting according to the order relation of the contents respectively represented by the elements $M_0, \ldots, M_{n+m-1}$ corresponding to the sequence [M] by secure computation while maintaining the correspondence between $[s_q]$ and $[M_q]$, to obtain and output the sorted sequences ([s'], [M']) ($[s']=[s'_0], \ldots, [s'_{n+m-1}]$), $[M]=([M'_0], \ldots, [M'_{n+m-1}])$). Since the sorting is stable, the order relation of the plurality of elements of the sequence [M] corresponding to the same content (for example, the same alphabet "b") is maintained in the sorted sequence ([s'], [M']). Here, the correspondence between $[s_q]$ and $[M_q]$ before sorting is also maintained in the sorted sequence ([s'], [M']). Therefore, the elements $[s'_{q(1)}], \ldots, [s'_{q(Q)}] \in \{[s'], \ldots, [s])\}$ of the sequence [s'] associated with the elements $[M'_{q(1)}], \ldots, [M'_{q(Q)}] \in \{[M'_0], \ldots, [M'_{n+m-1}]\}$ of the sequence [M'] corresponding to the same content are one in which one or more $[B_0]$ (for example, [0]) corresponding to the multiset X are consecutively arranged, one or more $[B_1]$ (for example, [1]) corresponding to the multiset Y are consecutively arranged after one or more $[B_0]$ (for example, [0]) corresponding to the multiset X are consecutively arranged, or one or more $[B_1]$ (for example, [1]) corresponding to the multiset Y are consecutively arranged (see, for example, Expression (6)). Therefore, the output flag $[f_q]$ obtained by the output flag generation unit 116-$w$ is such that (I) $M'_q = M'_{q+1}$, and $f_q = D_1$ (for example, 1) for $[M'_q]$ in which $M'_q$ and $M'_{q+1}$ correspond to mutually different multisets X and Y, and (II) $f_q = D_0$ (for example, 0) for other $[M'_q]$ (see, for example, Expression (13)). Therefore, $M'_q$ corresponding to the element $[M'_q]$ of (I) is an element of Intersect (X, Y)=X'∩Y', and the concealed operation result [Z] including the output flag $[f_q]$ and the sorted element $[M'_q]$ represents concealed information [Intersect (X, Y)] of Intersect (X, Y)=X'∩Y'. For example, in a case of X={{$x_0, x_1, x_2, x_3, x_4$}}={{a, a, b, c, d}} and Y={{$y_0, y_1, y_2$}}={{b, b, c}}, Intersect (X, Y)={b, c}, and in the concealed operation result [Z] of the corresponding expression (13), the output flag [1] is associated with one sorted element [b] [c], and the output flag [0] is associated with the other sorted elements.

As described above, in the present embodiment, flags representing whether $M_q$ belongs to the multiset X or the multiset Y are concealed and added to each element $[M_q]$, and using these concealed flags ([s]), regardless of whether or not the multiset X or the multiset Y includes overlapping elements, the logical product X'∩Y' is calculated by secure computation, and the concealed operation result [2] representing the concealed information [Intersect (X, Y)] of the operation result of Intersect (X, Y) is obtained. The number of bits of the flag ([s]) is small, and the computation cost for determining flags in the equality check unit 115-$w$, that is, equality check of $[s'_q]$ and $[s'_{q+1}]$ is small. Furthermore, since there is no order dependency in the equality check between $[s'_q]$ and $[s'_{q+1}]$, it is also possible to execute processing for $q=0, \ldots, n+m-1$ in parallel. Therefore, the computation of the present embodiment can be executed at high speed. As described above, in the present embodiment, with the concealed information [X] and [Y] of the two multisets X and Y as an input, it is possible to obtain the concealed operation result [Z] representing the concealed information of Intersect (X, Y) at a small computation cost by secure computation.

Note that the concealed operation result [Z] may be used to restore Z, or may be used as an operator for subsequent secure computation. For example, an invalid row may be deleted from the concealed operation result [Z] by the method disclosed in Reference Literature 5 or the like, and the obtained result may be used for another database operation.

Reference Literature 5: Hiroki Sudo, Dai Ikarashi, "Implementation and evaluation of a secure computation database management system that discloses only the number of rows" In SCIS2021, pp. 1-6, 2021.

In addition, it is also possible to assign the concealed information of the valid flag indicating whether the row is the valid row or the invalid row while leaving the invalid row in order to conceal and handle the valid row in the concealed operation result [Z] and perform subsequent processing. Alternatively, in the input flag adding unit 112-$w$ described above, concealed information $[\Psi_q]$ of the valid flag indicating whether Ma is valid is added to each ($[s_q]$, $[M_q]$) of the input flagged sequence ([s], [M]), and the subsequent processing from steps S113-$w$ to S117-$w$ can be executed while maintaining the correspondence relationship of ($[s_q]$, $[M_q]$, $[\Psi_q]$), and the subsequent processing can be performed.

[Hardware Configuration]

The secure computation device 11-$w$ according to each embodiment is a device formed with a general-purpose or dedicated computer executing a predetermined program, the computer including a processor (a hardware processor) such as a central processing unit (CPU) and a memory such as a random access memory (RAM) and a read only memory (ROM), for example. That is, the secure computation device 11-$w$ in each embodiment includes processing circuitry designed to implement the components included in the respective secure computation devices, for example. The computer may include one processor and one memory, or may include a plurality of processors and a plurality of memories. The program may be installed in the computer, or may be recorded in a ROM or the like in advance. Also, some or all of the processing units may be formed with an electronic circuit that independently implements the processing functions, rather than an electronic circuit (circuitry) that forms the functional components by reading the program like a CPU. Also, an electronic circuit forming one device may include a plurality of CPUs.

Figure 4:
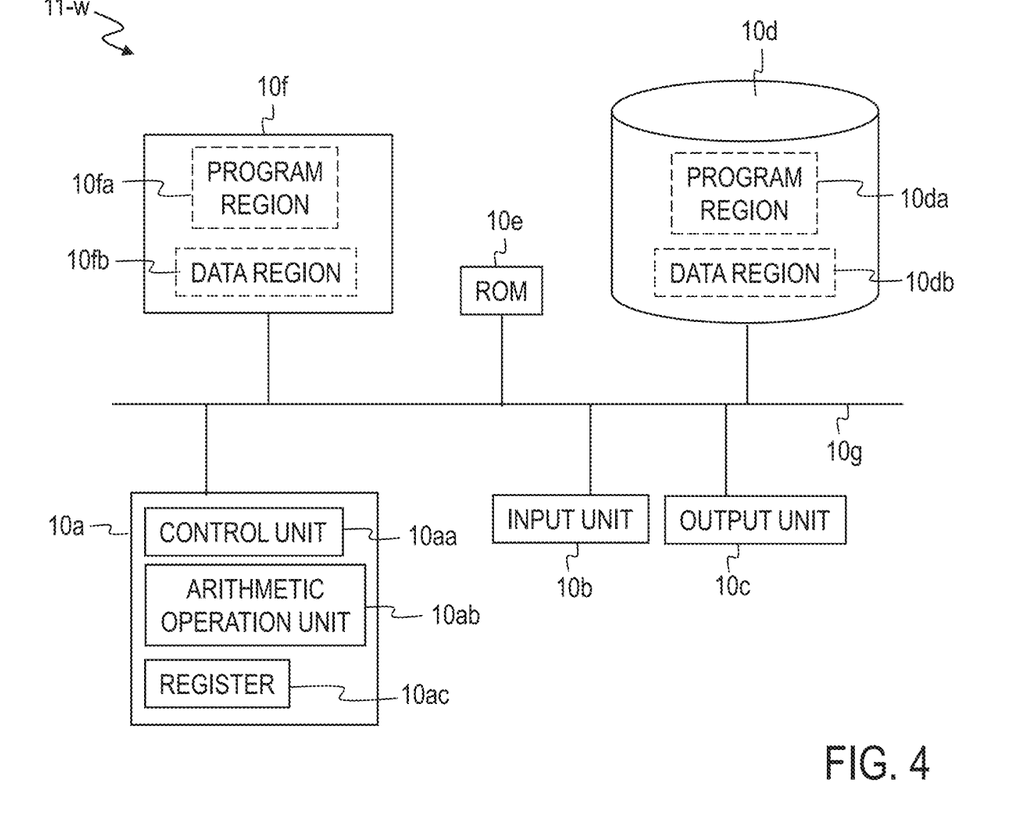
FIG. 4 is a block diagram illustrating a hardware configuration of the secure computation device according to the embodiment.

FIG. 4 is a block diagram illustrating an example hardware configuration of the secure computation device 11-$w$ according to each embodiment. As illustrated as the example in FIG. 4, the secure computation device 11-$w$ in this example includes a central processing unit (CPU) 10$a$, an input unit 10$b$, an output unit 10$c$, a random access memory (RAM) 10$d$, a read only memory (ROM) 10$e$, an auxiliary storage device 10$f$, and a bus 10$g$. The CPU 10$a$ in this example includes a control unit 10$aa$, an arithmetic operation unit 10$ab$, and a register 10$ac$, and performs various arithmetic operations in accordance with various programs read into the register 10$ac$. Meanwhile, the input unit 10$b$ is an input terminal to which data is input, a keyboard, a mouse, a touch panel, or the like. Also, the output unit 10$c$ is an output terminal from which data is output, a display, a LAN card or the like controlled by the CPU 10$a$ that has read a predetermined program. Further, the RAM 10$d$ is a static random access memory (SPAM), a dynamic random access memory (DRAM), or the like, and incudes a program region 10da in which a predetermined program is stored and a data region 10db in which various kinds of data are stored. Further, the auxiliary storage device 10f is a hard disk, a magneto-optical disc (MO), a semiconductor memory, or the like, for example, and includes a program region 10fa in which a predetermined program is stored and a data region 10fb in which various kinds of data are stored. Meanwhile, the bus 10g connects the CPU 10a, the input unit 10b, the output unit 10c, the RAM 10d, the ROM 10e, and the auxiliary storage device 10f so that information can be exchanged among these components. The CPU 10a writes, into the program region 10da of the RAM 10d, the program stored in the program region 10fa of the auxiliary storage device 10f, in accordance with a read operating system (OS) program. Likewise, the CPU 10a writes, into the data region 10db of the RAM 10d, the various kinds of data stored in the data region 10fb of the auxiliary storage device 10f. The addresses in the RAM 10d at which the program and the data are written are stored into the register 10ac of the CPU 10a. The control unit 10aa of the CPU 10a sequentially reads these addresses stored in the register 10ac, reads the program and the data from the regions in the RAM 10d indicated by the read addresses, causes the arithmetic operation unit 10ab to sequentially execute arithmetic operations indicated by the program, and stores results of the arithmetic operations into the register 10ac. With such a configuration, the functional components of the secure computation device 11-w are obtained.

The program mentioned above can be recorded in a computer-readable recording medium. The computer-readable recording medium in an example is a non-transitory recording medium. Examples of such a recording medium include a magnetic recording device, an optical disc, a magneto-optical recording medium, and a semiconductor memory.

The program is distributed by selling, giving, or renting portable recording media such as DVDs or CD-ROMs recording the program thereon, for example. Furthermore, a configuration in which the program is stored in a storage device in a server computer and the program is distributed by transferring the program from the server computer to other computers via a network may also be employed. As described above, the computer executing such a program first stores the program recorded in the portable recording medium or the program transferred from the server computer temporarily into a storage device of the computer, for example. The computer then reads the program stored in the storage device itself, and performs a process in accordance with the read program at the time of execution of the process. Also, in other execution modes of the program, the computer may read the program directly from the portable recording medium and performs a process in accordance with the program, or alternatively, the computer may sequentially execute a process in accordance with the received program every time the program is transferred from the server computer to the computer. Alternatively, the above processing may be executed by a so-called application service provider (ASP) service that implements a processing function only by issuing an instruction to execute the program and acquiring the result, without transferring the program from the server computer to the computer. Note that the program according to the present embodiment includes information used for processing by an electronic computer and equivalent to the program (data, or the like, that is not a direct command to the computer but has property that defines processing of the computer).

Although this device is formed with a computer executing a predetermined program in each embodiment, at least some of the processing contents may be realized by hardware.

Note that the present invention is not limited to the embodiments described above. For example, it may be executed not only in time series in accordance with the description but also in parallel or individually in accordance with processing abilities of the devices that execute the processes or as necessary. Further, appropriate modifications can of course be made without departing from the scope of the present invention.

INDUSTRIAL APPLICABILITY

The present invention can be applied to an application of performing an Intersect operation on two multisets by secure computation. For example, the present invention can be used for an application of performing the Intersect operation in a relational database management system (RDBMS) by means of secure computation.

REFERENCE SIGNS LIST

1 Secure computation system
11-w Secure computation device
112-W Input flag adding unit
114-w Stable sorting unit
115-W Equality check unit
116-w Output flag generation unit
117-w Output flag adding unit

The invention claimed is:

1. A secure computation device that obtains a concealed operation result representing concealed information of an Intersect operation result between a first multiset $X=\{\{x_0, \ldots, x_{n-1}\}\}$ and a second multiset $Y=\{\{y_0, \ldots, y_{m-1}\}\}$ while concealing the first multiset X and the second multiset Y, the device comprising processing circuitry configured to:

(A) receive n first elements $[x_0], \ldots, [x_{n-1}]$ and m second elements $[y_0], \ldots, [y_{m-1}]$ as inputs, and obtain an input flagged sequence $([s], [M])$ including a sequence $[s]=([s_0], \ldots, [s_{n-1}], [s_n], \ldots, [s_{n+m-1}])=([B_0], \ldots, [B_0], [B_1], \ldots, [B_1])$ including n first values $[B_0]$ and m second values $[B_1]$ and a sequence $[M]=([M_0], \ldots, [M_{n-1}], [M_n], \ldots, [M_{n+m-1}])=([x_0], \ldots, [x_{n-1}], [y_0], \ldots, [y_{m-1}])$ including first elements $[x_0], \ldots, [x_{n-1}]$ and second elements $[y_0], \ldots, [y_{m-1}]$ in which Bo and Bi are different from each other, each first value $[s_i]=[B_0]$ is associated with each first element $[M_i]=[x_i]$, and each second value $[s_{j+n}]=[B_1]$ is associated with each second element $[M_{j+n}]=[y_j]$, where n and m are positive integers, $i=0, \ldots, n-1$, $j=0, \ldots, m-1$, $q=0, \ldots, n+m-1$, and $[\alpha]$ is concealed information of $\alpha$;

(B) perform, by secure computation, stable sorting according to an order relation of content represented by each of elements $M_0, \ldots, M_{n+m-1}$ corresponding to the sequence [M] for the input flagged sequence $([s], [M])$ while maintaining a correspondence between $[s_q]$ and $[M_q]$, to obtain a sorted sequence $([s'], [M'])$ including a sequence $[s']=([s'_0], \ldots, [s'_{n+m-1}])$ of sorted values $[s'_0], \ldots, [s'_{n+m-1}]$ and a sequence $[M']=([M'_0], \ldots, [M'_{n+m-1}])$ of sorted elements $[M'_0], \ldots, [M'_{n+m-1}]$;

(C) obtains obtain a first equality check result $[eq_q]$ and a second equality check result $[seq_q]$ by secure computation using the sorted sequence $([s'], [M'])$, where $eq_q=T$ when $M'q=M'_{q+1}$ holds, $eq_q=F$ when $M'q=M'_{q+1}$ does not hold, $eq_{n+m-1}=F$, $seq_q=T$ when $s'q=s'q+1$ holds, $seq_q=F$ when $s'q=s'q+1$ does not hold, $seq_{n+m-1}=F$, and T and F are different from each other;
(D) obtain an output flag $[f_q]$ by secure computation using the first equality check result $[eq_q]$ and the second equality check result $[seq_q]$, where, $f_q=D_1$ when "$eq_q=T$ and $seq_q=F$" holds, $f_q=Do$ when "$eq_q=T$ and $seq_q=F$" does not hold, and Di and Do are different from each other; and
(E) output the concealed operation result including the output flag and the sorted element $[M'_q]$ of the sequence $[M']$ associated with each other.

2. The secure computation device according to claim 1, wherein
(A) the processing circuitry is configured to obtain the input flagged sequence ([s], [M]) represented by:

$$([s], [M]) = \begin{pmatrix} [s_0] & [M_0] \\ \vdots & \vdots \\ [s_{n-1}] & [M_{n-1}] \\ [s_n] & [M_n] \\ \vdots & \vdots \\ [s_{n+m-1}] & [M_{n+m-1}] \end{pmatrix} = \begin{pmatrix} [B_0] & [x_0] \\ \vdots & \vdots \\ [B_0] & [x_{n-1}] \\ [B_1] & [y_0] \\ \vdots & \vdots \\ [B_1] & [y_{m-1}] \end{pmatrix}$$

(B) the processing circuitry is configured to obtain the sorted sequence ([s'], [M']) represented by:

$$([s'], [M']) = \begin{pmatrix} [s'_0] & [M'_0] \\ \vdots & \vdots \\ [s'_{n+m-1}] & [M'_{n+m-1}] \end{pmatrix}$$

a sequence of $M'_0, \ldots, M'_{n+m-1}$ is a stable sorting result of a sequence of the elements $M_0, \ldots, M_{n+m-1}$ according to an order relation of content represented by each of the elements $M_0, \ldots, M_{n+m-1}$, and each sorted value $[s'_q]$ is an element $[s_r]$ associated with an element $[M_r]$ stably sorted into each sorted element $[M'_q]$ by secure computation, and $r=0, \ldots, n+m-1$.

3. A secure computation system having the secure computation device according to claim 1.

4. A secure computation method of a secure computation device that obtains a concealed operation result representing concealed information of an Intersect operation result between a first multiset $X=\{\{x_0, \ldots, x_{n-1}\}\}$ and a second multiset $Y=\{\{y_0, \ldots, y_{m-1}\}\}$ while concealing the first multiset X and the second multiset Y, the method comprising:

(A) an input flag adding step of receiving n first elements $[x_0], \ldots, [x_{n-1}]$ and m second elements $[y_0], \ldots, [y_{m-1}]$ as inputs, and obtaining an input flagged sequence ([s], [M]) including a sequence $[s]=([s_0], \ldots, [s_{n-1}], [s_n], \ldots, [s_{n+m-1}])=([B_0], \ldots, [B_0], [B_1], \ldots, [B_1])$ including n first values $[B_0]$ and m second values $[B_1]$ and a sequence $[M]=([M_0], \ldots, [M_{n-1}], [M_n], \ldots, [M_{n+m-1}])=([x_0], \ldots, [x_{n-1}], [y_0], \ldots, [y_{m-1}])$ including first elements $[x_0], \ldots, [x_{n-1}]$ and second elements $[y_0], \ldots, [y_{m-1}]$ in which $B_0$ and $B_1$ are different from each other, each first value $[s_i]=[B_0]$ is associated with each first element $[M_i]=[x_i]$, and each second value $[s_{j+n}]=[B_1]$ is associated with each second element $[M_{j+n}]=[y_j]$, where n and m are positive integers, $i=0, \ldots, n-1$, $j=0, \ldots, m-1$, $q=0, \ldots, n+m-1$, and $[\alpha]$ is concealed information of $\alpha$;

(B) a stable sorting step of performing stable sorting according to an order relation of content represented by each of elements $M_0, \ldots, M_{n+m-1}$ corresponding to the sequence [M] for the input flagged sequence ([s], [M]) while maintaining a correspondence between $[s_q]$ and $[M_q]$ by secure computation, to obtain a sorted sequence ([s'], [M']) including a sequence $[s']=([s'_0], \ldots, [s'_{n+m-1}])$ of sorted values $[s'_0], \ldots, [s'_{n+m-1}]$ and a sequence $[M']=([M'_0], \ldots, [M'_{n+m-1}])$ of sorted elements $[M'_0], \ldots, [M'_{n+m-1}]$;

(C) an equality check step of obtaining a first equality check result $[eq_q]$ and a second equality check result $[seq_q]$ by secure computation using the sorted sequence ([s'], [M']), where $eq_q=T$ when $M'_q=M'_{q+1}$ holds, $eq_q=F$ when $M'_q=M'_{q+1}$ does not hold, $eq_{n+m-1}=F$, $seq_q=T$ when $s'_q=S'_{q+1}$ holds, $seq_q=F$ when $s'_q=S'_{q+1}$ does not hold, $seq_{n+m-1}=F$, and T and F are different from each other;

(D) an output flag generation step of obtaining an output flag $[f_q]$ by secure computation using the first equality check result $[eq_q]$ and the second equality check result $[seq_q]$, where $f_q=D_1$ when "$eq_q=T$ and $seq_q=F$" holds, $f_q=D_0$ when "$eq_q=T$ and $seq_q=F$" does not hold, and Di and Do are different from each other; and (E) an output flag adding step of outputting the concealed operation result including the output flag $[f_q]$ and the sorted element $[M'_q]$ of the sequence $[M']$ associated with each other.

5. A non-transitory computer-readable recording medium storing a program for causing a computer to function as the secure computation device according to claim 1.

* * * * *